April 2, 1946.　　P. L. GOEBEL ET AL　　2,397,734
ENGINE
Filed Oct. 23, 1942　　3 Sheets-Sheet 1
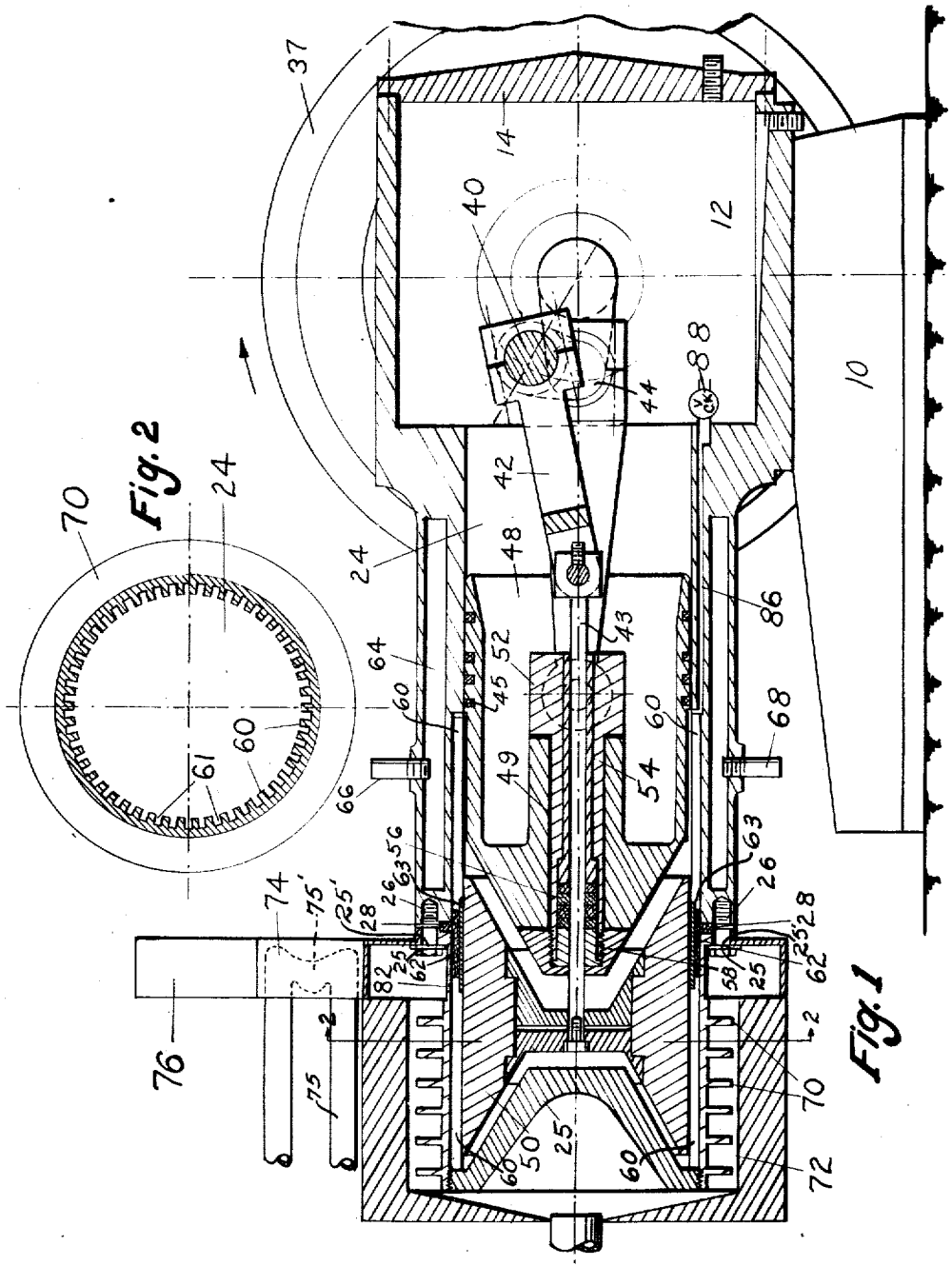
Paul L. Goebel
Lawrence M. Goebel
Inventors
by Roy M. Eilers
Atty.

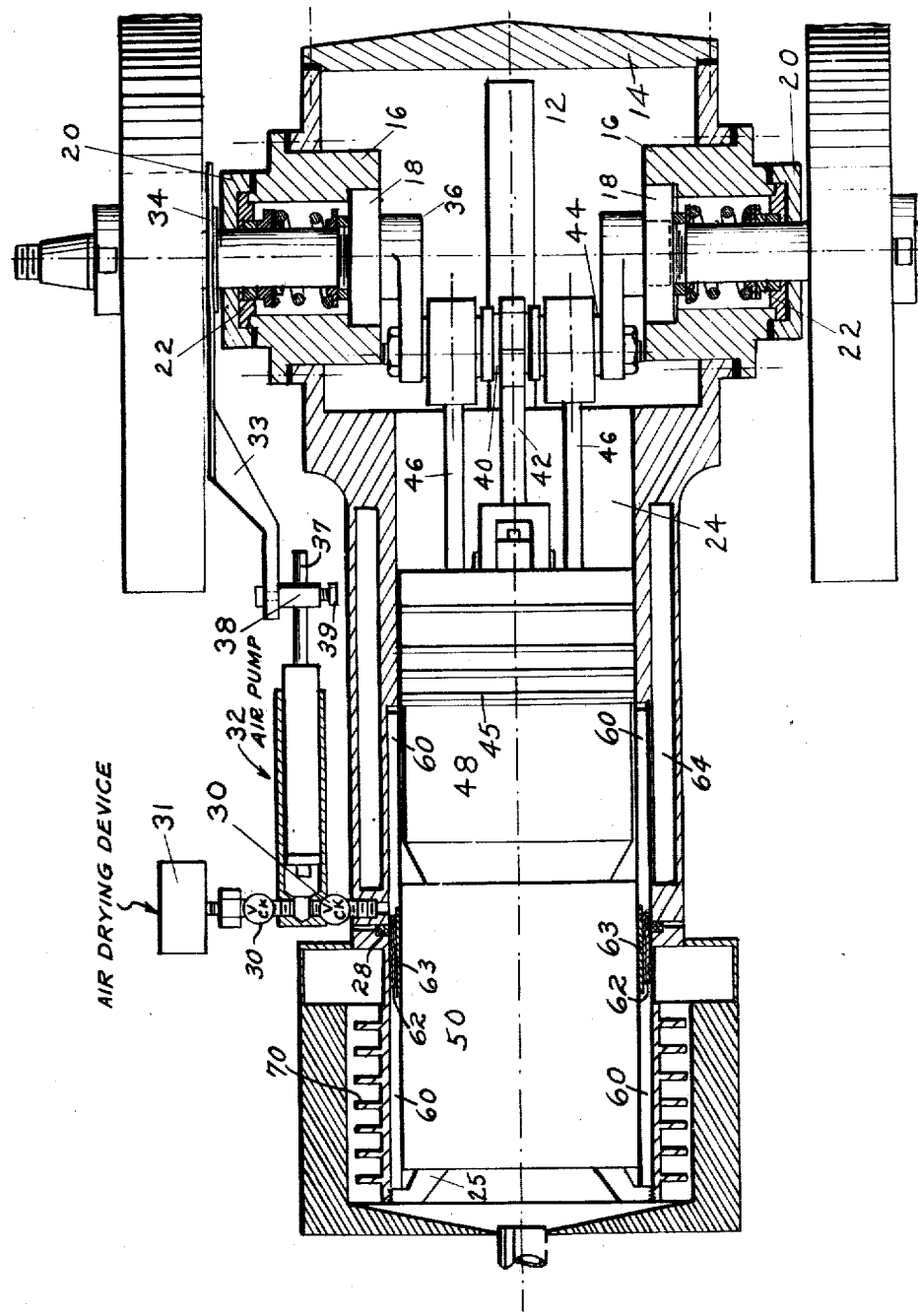

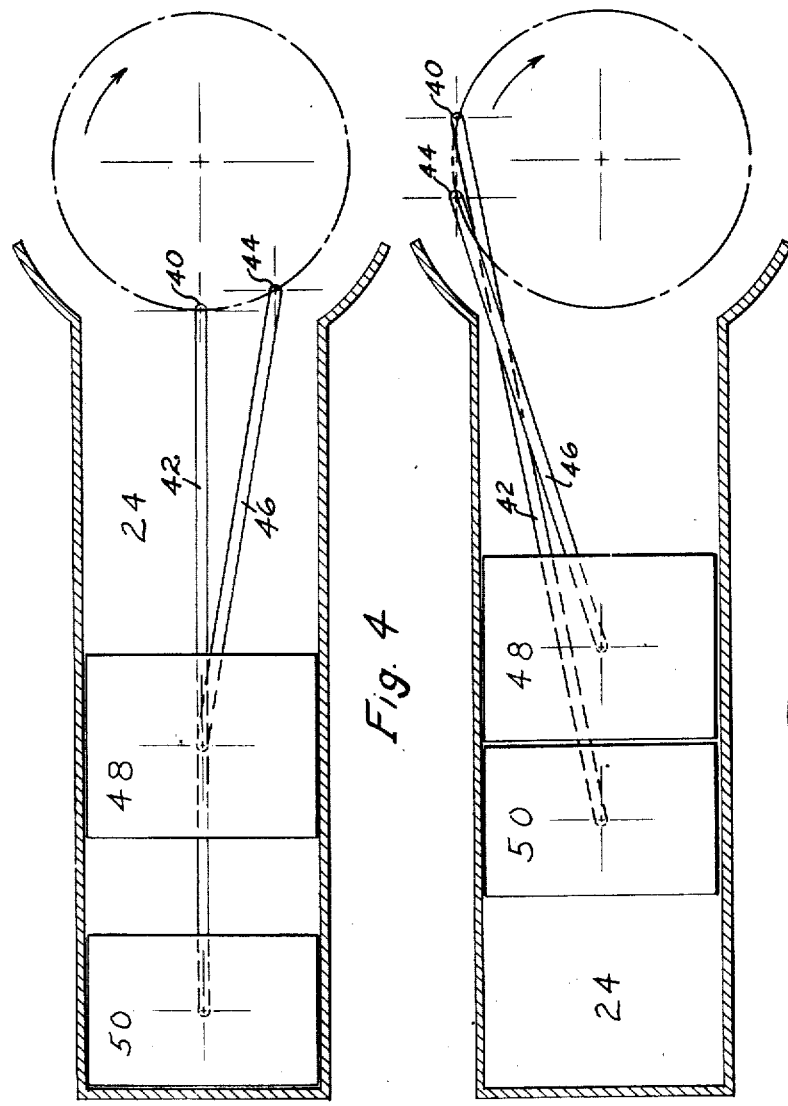

Patented Apr. 2, 1946

2,397,734

UNITED STATES PATENT OFFICE 2,397,734

ENGINE

Paul L. Goebel, Marietta, Ohio, and Lawrence M.
Goebel, Parkersburg, W. Va.

Application October 23, 1942, Serial No. 463,300

10 Claims. (Cl. 60—24)

This invention relates to improvements in engines. More particularly the invention relates to improvements in engines that are operated by the heating and cooling of air.

It is an object of the present invention to provide an improved hot air engine.

Hot air engines have been known for many years, but they have all been relatively slow running engines. Such engines had relatively low compression ratios and were not able to do the work demanded of modern engines. As a result, the hot air engine has not been accepted for general use and is not used extensively at the present time, although a hot air engine possesses some features that make it more desirable than internal combustion engines. The present invention for instance provides an improved hot air engine that can run at high speeds, has a high compression ratio and compares favorably with internal combustion engines. Such an engine is much more desirable than previous hot air engines because it is well suited to modern needs. It is, therefore, an object of the present invention to provide a hot air engine that has a high compression ratio and can run at high speeds.

In the operation of a hot air engine, an air moving plunger moves air from the cool to the hot portion of the cylinder and vice versa. This plunger must move in such a manner that it does not interfere with the movement of the piston, but it should move to attain maximum power for the engine. Such movement would result in a cycle wherein the plunger would move with and closely follow the piston during the power stroke of the engine and would lead the piston during the compression stroke. This results in an overlapping of the paths of movement of the plunger and piston that results in a smaller volume of the cylinder and makes possible the attainment of a high compression ratio. In the present invention, therefore, the plunger is arranged to lead the piston for a considerable portion of the compression stroke and to follow the piston for a considerable portion of the power stroke.

In hot air engines, the air moving plunger moves the air from the hot portion of the cylinder to the cold portion of the cylinder. To be really satisfactory, such a plunger should provide a relatively long path for air flowing from the hot to the cold portion of the cylinder and it should have a relatively small mass. The long path is desirable to permit the air to absorb or yield heat from or to the walls of the cylinder, and the small mass is desirable to reduce the thermal lag of the plunger. If the plunger were massive it would eventually store up a great amount of heat from the recurring heating periods and also from friction. This stored heat would tend to interfere with the proper cooling of the air in the engine and would decrease the efficiency of the engine. Furthermore, a small mass is desired because it can be reciprocated more readily at high speeds than a heavier mass. The present invention provides a plunger that meets the requirements of small mass and long heat flow path by forming recesses in the ends of the plunger. This construction reduces the mass of the plunger without decreasing the length of the face of the plunger. It is, therefore, an object of the present invention to provide a plunger for hot air engines, the ends of which have been recessed.

In the operation of hot air engines, air is periodically heated and cooled. The periodic heating and cooling of the air is needed to cause a change in the pressure of the air that operates the engine. To cool the air, it is necessary to extract heat from it, but it is desirable to conserve as much of the extracted heat as possible. The invention does this by providing an economizer that absorbs heat from the heated air. This absorbed heat is momentarily held by the economizer until the cool air flows into the hot portion of the cylinder, and it is then given back to the air. As a result, some of the heat is not lost but is held momentarily and then given back to the air. This saves heat and accordingly saves fuel. It is, therefore, an object of the present invention to provide an economizer to absorb heat from the heated air.

In a hot air engine, it is desirable to obtain a quick and ready transfer of heat. This is necessary to permit the engine to operate at high speeds. The present invention does this by providing the cylinder of the engine with internal and external fins that materially increase the area of the heating and cooling surfaces of the engine and thereby increase the rate of heat transfer into and out of the cylinder. These fins thus enable the engine to operate at high speeds. It is, therefore, an object of the present invention to provide internal and external fins for the cylinder of a hot air engine.

In the operation of the invention, air must flow from the hot to the cold portions of the cylinder and vice versa. In many hot air engines this has been accomplished by using a loosely fitting plunger so the air could flow between the outer periphery of the plunger and the inner periphery of the cylinder. Such an arrangement is not well suited to the requirements of a high speed engine and is therefore objectionable. The present invention obviates this objection by providing a close fitting plunger and ports in the cylinder walls. In this way the invention not only secures better plunger operation, but also secures better heat transfer between the air and the walls of the cylinder.

Other objects and advantages of the invention will become apparent from an examination of the drawings and accompanying description.

In the drawings and accompanying description, a preferred form of the invention is shown and described, but it is to be understood that the drawings and accompanying description do not limit the invention and the invention will be defined by the appended claims.

In the drawings

Fig. 1 is a partial sectional side elevation of a hot air engine made in accordance with the principles of the present invention. This view shows the piston of the engine in the position it assumes at the end of the compression stroke, Fig. 2 is a partial cross-sectional view of the cylinder of the engine shown in Fig. 1 and is taken along the plane 2—2, Fig. 3 is a partial sectional plan view of the engine shown in Fig. 1.

Fig. 4 is a schematic diagram of the engine showing the relative position of the plunger and piston when the plunger is on dead center, and Fig. 5 is a schematic diagram of the engine showing the relation of the plunger and piston between dead centers.

Referring to the drawings in detail a base for a hot air engine is denoted by the numeral 10. Supported on this base is a crank case 12 which has a closed end 14. The crank case 12 has a pair of bearing supports 16 that carry bearings 18. The supports 16 also carry sealing members 20 and resiliently biased shaft seals 22. The crank case 12 extends into and forms a part of cylinder 24. This cylinder is shown constructed in two parts but it may be made of any suitable construction. In the construction shown, the hot portion of the cylinder is held to the cold portion of the cylinder by bolts 25 that are secured in tapped holes 26. These bolts are preferably seated upon insulators 25' to reduce the transfer of heat from the hot to the cold portion of the cylinder. This particular construction is desirable since the portion of the cylinder that is most apt to wear out first can be replaced quite easily. The joint between the two parts of the cylinder is provided with a heat insulating gasket 28 that seals the joint and makes it air tight. The crank case and cylinder are constructed in this manner so the engine is completely air tight and will operate on the air or gas with which it is initially charged. The engine may be charged with air or any of a number of suitable gases, but for brevity the word "air" will be used herein to denote the air or gas used. The engine is charged with air through check valve 30 to any desired pressure and the air pump 32 having intake valve 30' and discharging through valve 30 may be adjusted to maintain that pressure in the engine at all times. If desired, an air drying device 31 may be used in conjunction with the pump to supply dry air for the engine at all times. The pump 32 is operated by an eccentric rod 33 that is actuated by an eccentric 34 on the crank-shaft 36. A connecting collar 38 swivelly carried at the end of rod 33 is adjustably secured to the pump rod 37 by means of a set screw 39 to permit variation of the clearance volume thereof and thereby determine the pressure exerted by the pump. The shaft 36 is provided with crank pins 40 and 44 that are mounted eccentrically of the shaft. The crank pin 40 receives and actuates the plunger connecting rod 42 and the crank pins 44 receive and actuate the piston connecting rods 46. Pivotally connected to the piston connecting rods 46 is a piston 48 and pivotally connected to the plunger connecting rod 42 is a plunger 50. The plunger 50 preferably has the form of a cylinder with two axial recesses at its opposite ends which have the shape of a frustum of a cone. This plunger is preferably made of a non-porous material that has good thermal insulating characteristics. This plunger moves back and forth in the cylinder 24 and moves air from the hot portion of the cylinder to the cold portion of the cylinder and vice versa. This form of plunger is particularly desirable because it provides a long path for air moving around the outer surfaces of the plunger and it also permits the plunger to have a relatively small mass. The small mass of the plunger is desirable because it reduces the thermal lag of the engine and also permits the attainment of high speeds. The recess in the outer end of the plunger is substantially complementary to the inwardly projecting end 25 of the cylinder and it closely approaches the end 25 of the cylinder during the operation of the engine. The recess in the inner end of the plunger is substantially complementary to the outer end of the piston, which said end has the shape of the frustum of a cone. This inner end of the plunger closely approaches the end of the piston during the operation of the engine, as is well illustrated in Fig. 5. The piston 48 has a hollow portion 49 extending substantially through its axial center to receive the wrist pin carrier 52 of the piston 48. This wrist pin carrier is provided with a bearing sleeve 54 on its inner surface and a recess 56 for packing. The outer portion of the end of this carrier 52 is threaded to receive a nut 58 that secures the carrier to the piston and forms the outer-most end of the piston. An elongated rod shaped member 43 connected to the plunger extends through the bushing carried by the wrist pin carrier and permits the plunger to move relative to the piston. The piston has a skirt which is provided with compression and oil rings 45 of the conventional type. The inner face of that portion of the cylinder not traversed by the rings of the piston is provided with a plurality of longitudinally extending recesses 61, the intervening rib- or ridge-like portions constituting in effect fins 60. These fins serve a dual function in that they increase the area of the heating and cooling surfaces of the interior of the cylinder and they also form spaces 61 between them that are ports for the air moved in the engine. In the construction shown, the heating and cooling fins do not touch each other but are spaced apart by an economizer 62 and held in place by an internal retaining ring 63. This economizer may have any suitable form but it must permit air to pass through it and it should be made of material to allow a temperature gradient through it. One form of economizer that has been found to be particularly desirable, consists of a plurality of metal screens. When the air is moved from the hot to the cold portion of the cylinder it will pass through the economizer 62 and yield some of its heat to the economizers. When the air is moved back from the cold to the hot portion it will pick up the heat it stored in the economizer 62. This increases the efficiency of the engine. The cold portion of the cylinder is kept cool by the provision of a water jacket 64 which is provided with a water inlet 68 and outlet 66. These connections are of the usual type to receive water from a source of supply and to conduct that water to sewage connections, or to a cooler of any suitable type. The hot portion of the cylinder has a plurality of circumferentially extending fins 70. These fins are enclosed by a furnace 72 into which heated gases are introduced. The heated gases passe through the furnace and contact the fins before they are exhausted into a heat exchanger 74 and an exhaust pipe 76. The heat exchanger 74 initially warms the air used in the fuel combustion process as it passes through pipe 75 and thereby increases the efficiency of that combustion.

The drawings show a plurality of longitudinally extending fins 60 on the inner periphery of the cylinder and a plurality of circumferentially extending fins on the outer periphery of the cylinder. These fins transfer heat from the hot gases to the air in the cylinder and fins 60 guide the air as it flows through ports 61 between the hot and cold portions of the cylinder. This construction is quite satisfactory but is not the only construction contemplated. By the use of this construction, the quick and ready transfer of heat through the walls of the cylinder is accomplished.

A conduit 86 is provided that connects crank case 12 with one or more of the ports 61 formed by the fins 60. This conduit is arranged to conduct excess oil from the cylinder to the crankcase. The flow of oil into the crankcase is fostered by the periodic compression of the air in the cylinder. A check valve 88 is provided that prevents flow of air through the conduit from the crankcase into the cylinder.

The operation of the engine is as follows:

A charge of air is impressed on the cylinder and crankcase by any suitable means, heat is applied to the hot end of the cylinder, and water is passed through the water jacket. The heat will usually be the product of combustion from a furnace or heater. The engine is then turned by a crank or a starter of any suitable design and construction. The plunger 50 is angularly disposed with relation to the piston 48 and in the drawings is shown as being 30 degrees ahead of the piston. The plunger may be set as much as 60° ahead of the piston or it may be set as little as 10° or 15° ahead of the piston. The smaller the angle the greater the compression ratio attainable, and an angle of 30° has been found to be very satisfactory. As this may be expressed in terms of the maximum spacing of the piston and plunger occurring in the engine operating cycle, the crank spacing of the crank circle, herein given as approximately 30 degrees, is such that the greatest separation of the piston and plunger permitted thereby, does not exceed a distance equal to the product of the cosine of the crank spacing angle (30 degrees or less as herein preferred) and the radius of the cranks. The stroke of the piston 48 and the stroke of the plunger 50 are preferably made exactly the same since this reduces the volume of air in the engine and thereby increases the compression ratio. Where desired however, the stroke of the plunger may be varied somewhat to achieve a slightly different relative movement of the plunger and piston. This variation cannot be very great and should be less than 25%. When the shaft 36 starts to rotate, the plunger 50 will move toward the hot portion of the cylinder and will be followed 30° later by the piston 48. This movement of the plunger moves the air into the cold portion of the cylinder. The movement of the piston into the hot portion of the cylinder causes a compression of the air in the cylinder that is additional to the compression given when the air was injected into the engine. Thirty degrees before the piston reaches dead center, the plunger starts to move outward. This draws in air between the plunger and the end 25 of the cylinder, which constitutes the hot portion of the cylinder. When this occurs, the air immediately absorbs heat from the fins 60 on the inside of the cylinder and begins to expand. This expansion further increases the pressure in the cylinder and as the fly wheel 37 rotates and the piston 48 starts to move back, the pressure forces the piston back and delivers power to the fly wheel 37. As the piston approaches a position halfway between its dead centers it is closely followed by the plunger as shown in Fig. 5. At this moment, all of the air is in the hot portion and is being expanded. This provides considerable power for the power stroke. As the piston approaches its other dead center, the plunger starts to move into the hot portion of the cylinder again and to move air into the cold portion of the cylinder. This immediately causes an extraction of heat from the air that results in a reduction of the volume of the air and a consequent reduction of the pressure. The piston is then able to move back into the hot portion of the cylinder on the compression stroke. The piston and plunger must be so related that they do not hit each other in the operation of the engine, but it is advantageous to have their respective paths overlap a considerable distance. Where this is the case, the over-all volume of the cylinder can be made considerably less and the compression ratio thereby made relatively high. In the present construction, the plunger path overlaps about three-fourths of the piston path; and this overlapping cuts down the volume of the cylinder considerably. Furthermore, this arrangement makes the residual volume of the engine considerably less than the swept volume and thereby provides a high compression ratio for the engine.

The hot portion of the cylinder is provided with circumferentially extending fins 70 that act as a re-enforcement for the walls of the cylinder and as heat transferring agents. By use of this construction it is possible to make a thin walled cylinder. This is desirable because such a wall will have less thermal lag and will quickly transfer heat to the air in the cylinder.

The wall of the cylinder is further reduced adjacent the junction between the hot portion of the cylinder and the cold portion of the cylinder. This thin wall is indicated by the numeral 82. This thinning of the wall is done to reduce the heat conduction losses longitudinally through the wall of the cylinder. The thinner the wall, the less area for heat to pass through and the less heat lost to the cold portion of the cylinder through the wall of the cylinder.

Whereas the drawings and accompanying description show and describe a preferred embodiment of the invention, it is obvious to those skilled in the art that various changes in the form of the invention may be made that do not affect the form of the invention.

What we claim is:

1. In a hot air engine having a high effective compression ratio, a cylinder having an internal bore, a head closing one end of the cylinder, a working piston slidably engaging the bore of the cylinder, a plunger having the same circumferential size and shape as the piston in the planes of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder, a rotatable shaft, means for connecting the piston eccentrically of the shaft to effect rotation thereof in response to movement of the piston, means for connecting the plunger eccentrically of the shaft to effect movement of the plunger in response to rotation of the shaft, the difference between the eccentricity of the connection to the piston and that of the connection to the plunger being of such magnitude and the two connecting means being so constructed that the stroke of the plunger differs in magnitude from the stroke of the piston by less than 25% of the piston stroke, the eccentricity of the connection to the plunger having a leading angle between about 10° and 30° with respect to that of the connection to the piston, the connecting means being so dimensioned that the plunger closely approaches, without hitting, the cylinder head and the piston alternately.

2. A hot air engine in accordance with claim 1 in which the eccentricities of the connections to the plunger and piston are of such magnitude and the two connecting means are so constructed that the strokes of the plunger and the piston are substantially the same.

3. A hot air engine in accordance with claim 1 in which the eccentricities of the connections to the plunger and piston are of such magnitude and the two connecting means are so constructed that the strokes of the plunger and the piston are substantially the same and the eccentricity of the connection to the plunger has a leading angle of about 30° with respect to that of the connection to the piston.

4. In a hot air engine having a high effective compression ratio, a cylinder having an internal bore, a head closing one end of the cylinder, a working piston slidably engaging the bore of the cylinder and having a passage extending longitudinally therethrough, a plunger having the same circumferential size and shape as the piston in the plane of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder comprising passageways recessed in the internal wall of the cylinder bore and communicating with the heated and cooled regions within the cylinder at opposite ends of the plunger at all positions thereof during its reciprocating movement, the piston having a portion of its skirt projecting a sufficient distance away from its face so that said skirt portion does not overlap the recessed portion of the cylinder bore at any portion of the travel of the piston therewithin, a rotatable shaft, means for connecting the piston eccentrically of the shaft to effect rotation thereof in response to movement of the piston, means extending through the passage in the piston for connecting the plunger eccentrically of the shaft to effect movement of the plunger in response to rotation of the shaft, the difference between the eccentricity of the connection to the piston and that of the connection to the plunger being less than 25% of the eccentricity of the connection to the piston, and the eccentricity of the connection to the plunger having a leading angle between about 10° and 60° with respect to that of the connection to the piston, the connecting means being so dimensioned that the plunger closely approaches, without hitting, the cylinder head and the piston alternately.

5. In a hot air engine having a high effective compression ratio, a cylinder having an internal bore, a head closing one end of the cylinder, a working piston slidably engaging the bore of the cylinder and having a passage extending longitudinally therethrough, a plunger having the same circumferential size and shape as the piston in the plane of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder, a rotatable crankshaft having a plurality of crank portions eccentric of the main axis of the shaft, a connecting rod pivotally attached at one end to the piston and at the other end to one of the crank portions of the shaft, a slidable member connected to the plunger and extending through the passage of the piston, a second connecting rod pivotally attached at one end to the slidable rod and at the other end to a second crank portion of the shaft, the difference between the eccentricities of the first and second crank portions being less than 25% of the first crank portion and the second crank portion having a leading angle about the main axis of the shaft between about 10° and about 30° with respect to the first crank.

6. In a hot air engine having a high effective compression ratio, a cylinder having an internal bore, a head closing one end of the cylinder, a working piston slidably engaging the bore of the cylinder and having a passage extending longitudinally therethrough, a plunger having the same circumferential size and shape as the piston in the plane of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder, a rotatable crankshaft having a plurality of crank portions eccentric of the main axis of the shaft, a connecting rod pivotally attached at one end to the piston and at the other end to one of the crank portions of the shaft, a slidable member connected to the plunger and extending through the passage of the piston, a second connecting rod pivotally attached at one end to the slidable rod and at the other end to a second crank portion of the shaft, the eccentricities of the first and second crank portions being substantially the same and the second crank portion having a leading angle about the main axis of the shaft between about 10° and about 30° with respect to the first crank.

7. In a hot air engine having a high effective compression ratio, a cylinder having an internal bore, a head closing one end of the cylinder, a working piston slidably engaging the bore of the cylinder and having a passage extending longitudinally therethrough, a plunger having the same circumferential size and shape as the piston in the plane of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder, a rotatable crankshaft having a plurality of crank portions eccentric of the main axis of the shaft, a connecting rod pivotally attached at one end to the piston and at the other end to one of the crank portions of the shaft, a slidable member connected to the plunger and extending through the passage of the piston, a second connecting rod pivotally attached at one end to the slidable rod and at the other end to a second crank portion of the shaft, the eccentricities of the first and second crank portions being substantially the same and the second crank portion having a leading angle about the main axis of the shaft of 30° with respect to the first crank.

8. In a hot air engine having a high effective compression ratio, a cylinder having an internal bore, a head closing one end of the cylinder, a working piston slidably engaging the bore of the cylinder and having a passage extending longitudinally therethrough, a plunger having the same circumferential size and shape as the piston in the plane of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder comprising passageways recessed in the internal wall of the cylinder bore and communicating with the heated and cooled regions within the cylinder at opposite ends of the plunger at all positions thereof during its reciprocating movement, the piston having a portion of its skirt projecting a sufficient distance away from its face so that said skirt portion does not overlap the recessed portion of the cylinder bore at any portion of the travel of the piston therewithin, a rotatable crankshaft having a plurality of crank portions eccentric of the main axis of the shaft, a connecting rod pivotally attached at one end to the piston and at the other end to one of the crank portions of the shaft, a slidable member connected to the plunger and extending through the passage of the piston, a second connecting rod pivotally attached at one end to the slidable rod and at the other end to a second crank portion of the shaft, the difference between the eccentricities of the first and second crank portions being less than 25% of the first crank portion and the second crank portion having a leading angle about the main axis of the shaft between about 10° and 60° with respect to the first crank.

9. In a hot air engine having a high effective compression ratio, a cylinder having an internal bore, a head closing one end of the cylinder, a working piston slidably engaging the bore of the cylinder and having a passage extending longitudinally therethrough, a plunger having the same circumferential size and shape as the piston in the plane of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder comprising passageways recessed in the internal wall of the cylinder bore and communicating with the heated and cooled regions within the cylinder at opposite ends of the plunger at all positions thereof during its reciprocating movement, the piston having a portion of its skirt projecting a sufficient distance away from its face so that said skirt portion does not overlap the recessed portion of the cylinder bore at any portion of the travel of the piston therewithin, a rotatable crankshaft having a plurality of crank portions eccentric of the main axis of the shaft, a connecting rod pivotally attached at one end to the piston and at the other end to one of the crank portions of the shaft, a slidable member connected to the plunger and extending through the passage of the piston, a second connecting rod pivotally attached at one end to the slidable rod and at the other end to a second crank portion of the shaft, the eccentricities of the first and second crank portions being substantially the same and the second crank portion having a leading angle with the main axis of the shaft between about 10° and about 30° with respect to the first crank.

10. In a hot air engine having a high effective compression ratio, a cylinder having an internal bore, a head closing one end of the cylinder, a working piston slidably engaging the bore of the cylinder, a plunger having the same circumferential size and shape as the piston in the plane of their maximum transverse cross-section, the plunger slidably engaging the internal bore of the cylinder and being disposed between the piston and the cylinder head, means for heating the cylinder head, means whereby a portion of the cylinder adjacent the piston can be cooled, means for allowing passage of a working fluid with respect to the plunger alternately between the heated and cooled regions within the cylinder comprising passageways recessed in the internal wall of the cylinder bore and communicating with the heated and cooled regions within the cylinder at opposite ends of the plunger at all positions thereof during its reciprocating movement, the piston having a portion of its skirt projecting a sufficient distance away from its face so that said skirt portion does not overlap the recessed portion of the cylinder bore at any portion of the travel of the piston therewithin, sealing means around said skirt portion, a rotatable shaft, means for connecting the piston eccentrically of the shaft to effect rotation thereof in response to movement of the piston, means for connecting the plunger eccentrically of the shaft to effect movement of the plunger in response to rotation of the shaft, the difference between the eccentricity of the connection to the piston and that of the connection to the plunger being less than 25% of the eccentricity of the connection to the piston, and the eccentricity of the connection to the plunger having a leading angle between about 10° and 60° with respect to that of the connection to the piston, the connecting means being so dimensioned that the plunger closely approaches, without hitting, the cylinder head and the piston alternately.

PAUL L. GOEBEL.
LAWRENCE M. GOEBEL.

Certificate of Correction

Patent No. 2,397,734.                                                              April 2, 1946.

PAUL L. GOEBEL ET AL.

It is hereby certified that error appears in the printed specification of the above numbered patent requiring correction as follows: Page 4, first column, line 32, claim 1, for "and 30°" read *and about 30°*; and that the said Letters Patent should be read with this correction therein that the same may conform to the record of the case in the Patent Office.

Signed and sealed this 18th day of June, A. D. 1946;

[SEAL]

LESLIE FRAZER,
*First Assistant Commissioner of Patents.* sponse to rotation of the shaft, the difference between the eccentricity of the connection to the piston and that of the connection to the plunger being less than 25% of the eccentricity of the connection to the piston, and the eccentricity of the connection to the plunger having a leading angle between about 10° and 60° with respect to that of the connection to the piston, the connecting means being so dimensioned that the plunger closely approaches, without hitting, the cylinder head and the piston alternately.

PAUL L. GOEBEL.
LAWRENCE M. GOEBEL.

Certificate of Correction

Patent No. 2,397,734.  April 2, 1946.

PAUL L. GOEBEL ET AL.

It is hereby certified that error appears in the printed specification of the above numbered patent requiring correction as follows: Page 4, first column, line 32, claim 1, for "and 30°" read *and about 30°*; and that the said Letters Patent should be read with this correction therein that the same may conform to the record of the case in the Patent Office.

Signed and sealed this 18th day of June, A. D. 1946.

[SEAL]

LESLIE FRAZER,
*First Assistant Commissioner of Patents.*